United States Patent [19]

Hurst et al.

[11] Patent Number: 4,487,220
[45] Date of Patent: Dec. 11, 1984

[54] FUEL DISTRIBUTION VALVE WITH THERMAL BUFFER MEMBER

[75] Inventors: Jeffrey B. Hurst, Troy; Jerome R. Bradley, Sterling Heights, both of Mich.

[73] Assignee: Ex-Cell-O Corporation, Troy, Mich.

[21] Appl. No.: 522,443

[22] Filed: Aug. 12, 1983

[51] Int. Cl.³ ............................................. F16K 11/00
[52] U.S. Cl. .................................. 137/375; 137/118; 251/364; 251/368
[58] Field of Search ............... 137/375, 118; 251/360, 251/364, 368; 60/741; 428/36, 212

[56] References Cited

U.S. PATENT DOCUMENTS 2,832,368  4/1958  Freer ..................................... 137/118
4,226,365  10/1980  Norris et al. ......................... 137/118

*Primary Examiner*—Martin P. Schwadron
*Assistant Examiner*—James R. Shay
*Attorney, Agent, or Firm*—Edward J. Timmer

[57] ABSTRACT

A fuel distribution valve assembly is provided with a laminated thermal buffer member between the valve housing and inner valve means to prevent binding of the valve means from thermal effects.

16 Claims, 4 Drawing Figures ection valve.

FUEL DISTRIBUTION VALVE WITH THERMAL BUFFER MEMBER

FIELD OF THE INVENTION

This invention relates to fuel flow distribution valves especially useful for gas turbine engines.

BACKGROUND OF THE INVENTION

Pending U.S. patent application Ser. No. 300,719 entitled "Fuel Distribution Valve" filed Sept. 10, 1981 in the names of Robert M. Halvorsen and Jeffrey B. Hurst and of common assignee herewith describes an improved fuel flow distribution valve for supplying fuel nozzles in a gas turbine engine.

As shown in FIG. 1, the fuel distribution valve of that application includes a valve housing 30 having an inlet 40 that conveys fuel across a spring biased pressure relieved filter assembly 44. The filtered fuel is then conveyed to an elongated spool valve 46 that is in a close tolerance diametrical fit relationship with the wall of a bore through a valve liner 50. Valve 46 includes a plurality of holes 60 which can be brought into registry with holes 58 in the valve liner 50 to allow fuel flow to discharge ports 70 through passages 56, 71.

In the past, the valve housing 30, valve 46 and valve liner 50 have been made of an aluminum alloy, such as Type C355-T6 for the housing and Type 6061-T6 for the valve and valve liner. Prior art workers have expressed some concern that the spool valve holes 60 and valve liner holes 58 might suffer erosion in use as a result of pressurized fuel flow therethrough. To reduce or avoid the erosion possibility it was proposed to make the spool valve and valve liner out of a wear resistant stainless steel such as Type 440C stainless steel. However, a fuel distribution valve constructed in this manner exhibited spool valve binding when the assembly was operated at only 30° F., the binding resulting from the large difference between the thermal expansion coefficient of the aluminum housing (e.g. $13 \times 10^{-6}$ in/in/°F.) and that of the stainless steel liner and spool valve (e.g. $8 \times 10^{-6}$ in/in/°F.).

SUMMARY OF THE INVENTION

The present invention contemplates a fuel distribution valve assembly of the type described hereinabove which includes a laminated thermal buffer means between a valve housing means having a relatively high thermal expansion coefficient and an inner valve means, such as valve liner and sliding spool valve, having relatively low thermal expansion coefficient to reduce or eliminate valve binding over an operating temperature range which may extend for example from −65° F. to 300° F.

The thermal buffer means typically comprises an outer annular lamina adjacent the valve housing having a thermal expansion coefficient generally matched, preferably substantially equal, to that of the housing means, an inner annular lamina adjacent the valve means having a thermal expansion coefficient generally matched, preferably substantially equal, to that of the valve means and an intermediate resilient annular lamina, preferably an elastomeric lamina, between and bonding the inner and outer lamina together as a replaceable unit.

The thermal buffer means typically includes a plurality of aperture means aligned in fuel flow relation with fuel ports in the valve housing and valve liner.

DESCRIPTION OF PREFERRED EMBODIMENTS

Figure 1:
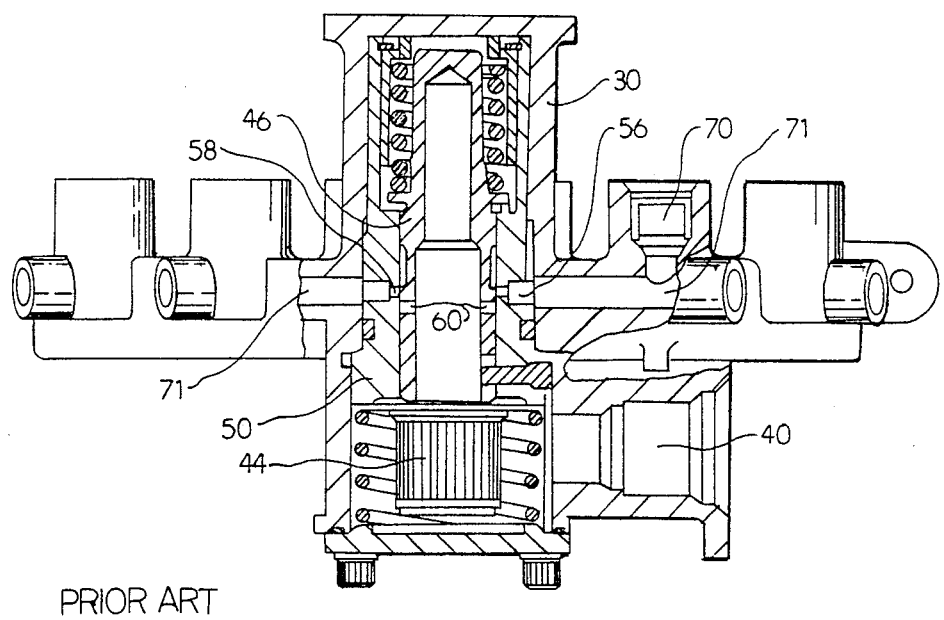
FIG. 1 is a longitudinal sectional view of a prior art fuel distribution valve.
Figure 2:
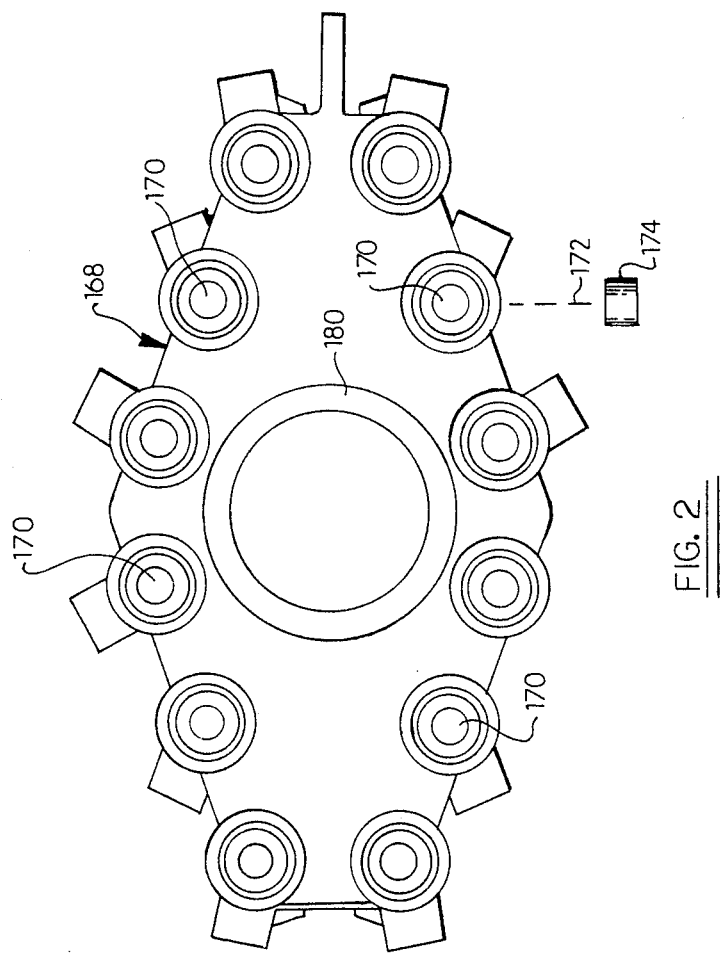
FIG. 2 is a top elevational view of a fuel distribution valve.
Figure 3:
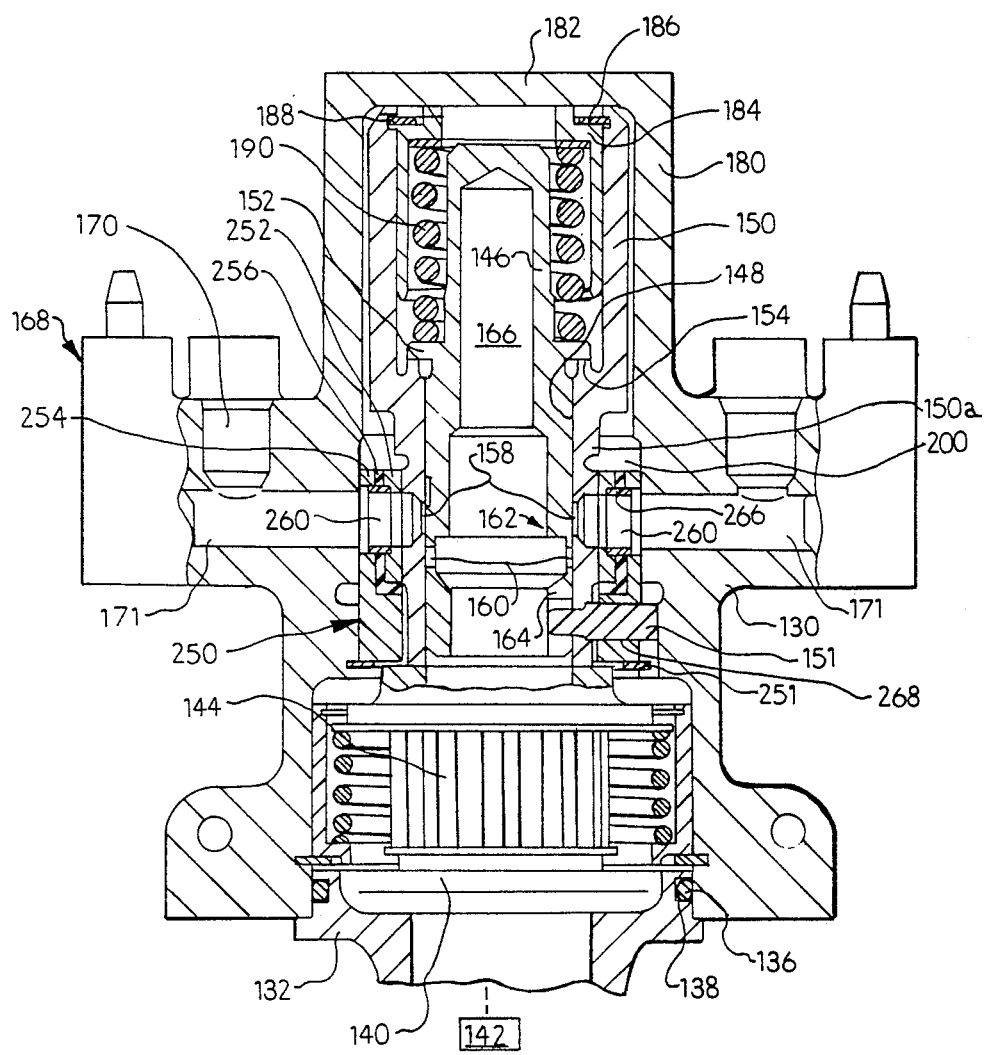
FIG. 3 is a similar longitudinal sectional view of a fuel distribution valve of the invention.

Referring to FIGS. 2 and 3, the fuel distribution valve includes a valve housing 130 that is closed by fuel inlet tube 132 at one end thereof, secured by four bolts (not shown) to the housing 130 and sealed with respect thereto by an O-ring seal 136 in groove 138. The valve housing 130 has an inlet 140 that directs fuel from a fuel controller 142 across a spring biased pressure relieved filter assembly 144. The filtered fluid is directed against an elongated spool valve 146 that is in a close tolerance diametrical fit relationship with the wall of a bore 148 through a valve liner 150. The valve liner is fixed against rotation with respect to the valve housing 130 by an anti-rotation pin 151. The spool valve 146 includes a flange 152 thereon for positioning the valve in a fuel shut-off position with respect to the housing 130. It is shown seated against a reference surface 154 on the liner 150 with it being understood that the flange 152 and surface 154 can be separated from one another to space the valve 146 in an offset relationship to the inner wall of bore 148. When in this position, a suitable machine tool is used to form a plurality of pairs of congruent flow controlling holes or slots 158, 160 at a flow control region 162 that is defined between a land 164 and the inner surface of the bore 148. The pairs of flow controlling metering holes or slots 158, 160 are formed with the valve 146 fixed in place within the liner 150. As a result any tolerance deviation during formation of either of the pair of holes which are aligned with one another, will be common to both of the holes of a pair of flow controlling holes so that each of the pairs of holes will accurately meter fuel flow from the interior 166 of the valve 146 through the discharge passages 171 thence through a football configured distribution head 168 on the valve housing 130, FIG. 3. Machining of the fuel flow controlling holes or slots 158, 160 as well as other details of the valve arrangement are described in the aforementioned co-pending U.S. application Ser. No. 300,719 entitled "Fuel Distribution Valve" filed Sept. 10, 1981, the teachings of which are hereby incorporated by reference herein.

The football shaped distribution head 168, more particularly, includes a plurality of upwardly facing discharge ports 170. The head 168 includes the passage 171 directed radially from each discharge aperture 260 of the thermal buffer means 250. The head 168 has substantially elliptically formed outer periphery which locates the twelve discharge fittings 170 in a direction which enables the body to be fitted in a space and all the conduits to extend axially from one direction of the location in which the body is secured. As a result the arrangement can easily be connected to a plurality of nozzle conduits 172 connected to nozzles 174.

The valve body 130 includes an integrally formed center section 180 that is closed at the upper end 182 thereof to eliminate the need for a seal at the spring biased end of the spool valve 146.

In this arrangement the liner 150 has a closure element or plate 184 located therein and retained by a snap ring 186 secured to the liner. A shim washer 188 is supported by the closure plate 184 to receive the end of a control spring 190 having the opposite end thereof secured to the flange 152 to impose a spring bias control on the sleeve 146 during valve operation.

As inlet pressure increases at the inlet port 140 the valve 146 will be moved upwardly against the biasing spring 190 until each hole 160 of the plurality of pairs of holes will open a like flow area through each of the pair of holes 158 at the regions 162 to produce a substantially equal flow of fuel from the flow control regions 162 to each of the discharge ports 170.

Figure 4:
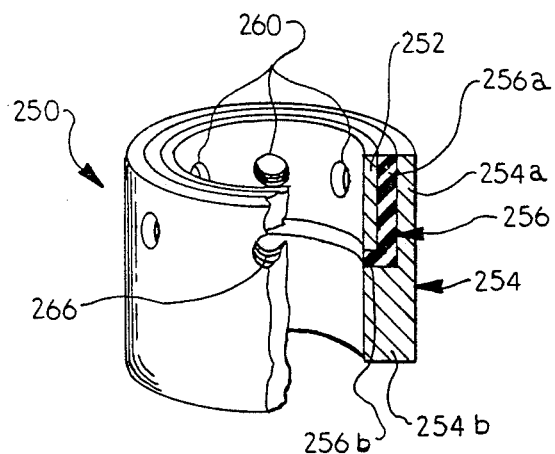
FIG. 4 is a perspective view partially broken away to show details of the thermal buffer member.

As shown in FIG. 3, the valve liner 150 includes a reduced diameter end 150a which forms an annular chamber 200 between the liner and the housing 130. Positioned in the chamber 200 between the valve liner and housing is a laminated thermal buffer member 250. A snap-ring 251 maintains the thermal buffer member in position. The thermal buffer member is a sandwich arrangement of an inner annular lamina 252, an outer annular lamina 254 generally L-shaped in cross-section and an intermediate annular lamina 256 of resilient material generally L-shaped in cross-section. The inner lamina 252 is in the form of a hollow cylinder preferably made of a Type 17-4 PH stainless steel having a thermal expansion coefficient $(8.3 \times 10^{-6}$ in/in/°F.) substantially the same as that of the valve liner 150 and spool valve 146 which are made of Type 440C stainless steel. As shown best in FIG. 4, the outer lamina 254 has a cylindrical portion 254a and radial lip portion 254b and is preferably made of aluminum alloy Type 6061-T6 having a thermal expansion coefficient $(13 \times 10^{-6}$ in/in/°F.) substantially equal to that of the housing 130 which is made of aluminum alloy Type C355-T6. The intermediate lamina 256 has a cylindrical portion 256a and radial lip portion 256b and is a resilient material capable of accommodating thermal dimensional changes and preferably is a flurosilicone elastomer, such as AMS 3327, hot injection molded between the inner lamina and outer lamina and bonding these components together as a unit.

As is apparent from FIG. 3, the thermal buffer member includes a plurality of radial apertures 260 in fuel flow relation with holes or ports 158 in valve liner 150. Movement of the spool valve 146 causes holes or ports 160 thereof to be brought into similar fuel flow relation with apertures 260 to provide a fuel flow condition. The apertures 260 each include a small diameter portion through a portion of the inner lamina 252 and a larger diameter portion extending through all three components of the thermal buffer member. Positioned in the larger diameter portion is a sleeve 266 made of Type 17-4 PH stainless steel. The sleeve 266 spans across the exposed end of the intermediate elastomeric lamina and functions to prevent extrusion of the elastomer into the aperture 260 during operation.

The outer lamina 254 includes at its lower end in FIG. 3 another aperture 268 which receives the anti-rotation pin 151.

Use of the thermal buffer means 250 just described has been found to eliminate the problem of binding of the spool valve 146 down to temperatures as low as −70° F. The thermal buffer means is insertable and replaceable as a unit as a result of the intermediate elastomeric lamina bonding the components thereof together as already mentioned.

While the fuel distribution valve assembly of the invention has been described by a detailed description of certain specific and preferred embodiments, it is understood that various modifications and changes can be made in them within the scope of the appended claims which are intended to include equivalents of such embodiments.

We claim:

1. In a fuel distribution valve assembly having a housing means with fuel inlet means and fuel discharge means and made of a material with a relatively high thermal expansion coefficient and having an inner valve means made of a material with a relatively low thermal expansion coefficient and slidable with close fit in a bore in said housing means, the improvement for reducing binding between the valve means and housing means from temperature fluctuations comprising a laminated thermal buffer means interposed between the housing means and valve means, said thermal buffer means including an outer lamina adjacent the housing means having a thermal expansion coefficient generally matched to that of said housing means, an inner lamina adjacent the valve means having a thermal expansion coefficient generally matched to that of said valve means and a resilient lamina between and bonding the inner lamina and outer lamina together.

2. The improved assembly of claim 1 wherein said thermal buffer means includes aperture means aligned in fuel flow relation to said fuel discharge means of said housing means.

3. The improved assembly of claim 2 wherein a sleeve means is positioned in the aperture means to prevent extrusion of the resilient intermediate lamina into said aperture means.

4. The improved assembly of claim 1 wherein said inner valve means has a reduced diameter section defining an annular chamber between said valve means and housing means and said thermal buffer means is annular in shape and is disposed in said chamber.

5. The improved assembly of claim 4 wherein said inner valve means comprises a valve liner means in a bore of said housing means and having the reduced diameter section at one end and a spool valve means slidably received in said liner means, said thermal buffer means being interposed between the housing means and the reduced diameter portion of said valve liner means.

6. The improved assembly of claim 1 wherein said thermal buffer means includes another aperture means adapted to receive anti-rotation pin means.

7. A thermal buffer member useful in a fuel distribution valve assembly, comprising an outer annular lamina made of a material with a relatively high thermal expansion coefficient, an inner annular lamina made of a material with a relatively low thermal expansion coefficient and an intermediate annular lamina between the inner lamina and outer lamina made of a resilient material, said intermediate resilient lamina bonding the inner and outer lamina together so that the thermal buffer member can be inserted or replaced as a unit in a fuel distribution valve assembly.

8. The thermal buffer member of claim 7 wherein the intermediate resilient lamina is an elastomeric material.

9. The thermal buffer member of claim 8 wherein the elastomeric lamina is hot injection molded between the inner lamina and the outer lamina.

10. The thermal buffer member of claim 7 which includes fuel aperture means extending radially therethrough.

11. The thermal buffer member of claim 10 which further includes a sleeve means in said aperture means to prevent extrusion of said resilient lamina into said aperture means.

12. The thermal buffer member of claim 11 which further includes a second aperture means extending radially therethrough adapted to receive an anti-rotation pin.

13. The thermal buffer member of claim 7 wherein said inner lamina is in the form of a hollow cylinder, said outer lamina has a cylindrical portion spaced from and extending axially parallel with said cylinder and a radial lip portion spaced from the end of said cylinder and overlying said end, and wherein the resilient lamina has a cylindrical portion between and bonding said cylinder with the cylindrical portion of said outer lamina and a radial lip portion between and bonding said end of said cylinder and the radial lip portion of said outer lamina.

14. The thermal buffer member of claim 13 which further includes a plurality of fuel apertures extending radially through said cylinder and through the cylindrical portions of said outer lamina and resilient lamina.

15. The thermal buffer member of claim 14 which further includes a hollow sleeve in each of said apertures extending across the exposed resilient lamina to prevent extrusion thereof into each aperture.

16. The thermal buffer member of claim 15 which further includes another aperture extending radially through the radial lip portions of said outer lamina and resilient lamina adapted to receive an anti-rotation pin.

* * * * *